United States Patent
Huang et al.

(10) Patent No.: US 10,097,091 B1
(45) Date of Patent: Oct. 9, 2018

(54) SETTING OPERATING POINTS FOR CIRCUITS IN AN INTEGRATED CIRCUIT CHIP

(71) Applicant: Advanced Micro Devices, Inc., Santa Clara, CA (US)

(72) Inventors: Wei Huang, Frisco, TX (US); Yasuko Eckert, Redmond, WA (US); Xudong An, Richardson, TX (US); Muhammad Shoaib Bin Altaf, Austin, TX (US); Jieming Yin, Bellevue, WA (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 0 days.

(21) Appl. No.: 15/793,951

(22) Filed: Oct. 25, 2017

(51) Int. Cl.
  G05F 1/00 (2006.01)
  H02M 3/158 (2006.01)
  G05F 1/575 (2006.01)
  G05F 1/46 (2006.01)
  G05F 1/56 (2006.01)
  H02M 1/00 (2006.01)

(52) U.S. Cl.
  CPC .......... *H02M 3/1582* (2013.01); *G05F 1/468* (2013.01); *G05F 1/56* (2013.01); *G05F 1/575* (2013.01); *H02M 2001/0022* (2013.01)

(58) Field of Classification Search
  CPC ....... H02M 3/1584; H02M 2003/1586; H02M 3/156; H02M 3/158; H04B 2215/069; G05F 1/56; G05F 1/575; G05F 1/465
  See application file for complete search history.

(56) References Cited

U.S. PATENT DOCUMENTS 9,886,048 B2 * 2/2018 Du ......................... G05F 1/575

* cited by examiner

*Primary Examiner* — Adolf Berhane
*Assistant Examiner* — Afework Demisse
(74) *Attorney, Agent, or Firm* — Park, Vaughan, Fleming & Dowler LLP

(57) ABSTRACT

The described embodiments include an apparatus that controls voltages for an integrated circuit chip having a set of circuits. The apparatus includes a switching voltage regulator separate from the integrated circuit chip and two or more low dropout (LDO) regulators fabricated on the integrated circuit chip. The switching voltage regulator provides an output voltage that is received as an input voltage by each of the two or more LDO regulators, and each of the two or more LDO regulators provides a local output voltage, each local output voltage received as a local input voltage by a different subset of the circuits in the set of circuits. During operation, a controller sets an operating point for each of the subsets of circuits based on a combined power efficiency for the subsets of the circuits and the LDO regulators, each operating point including a corresponding frequency and voltage.

20 Claims, 4 Drawing Sheets

SETTING OPERATING POINTS FOR CIRCUITS IN AN INTEGRATED CIRCUIT CHIP

GOVERNMENT RIGHTS

This invention was made with Government support under the PathForward Project with Lawrence Livermore National Security (prime contract no. DE-AC52-07NA27344, subcontract no. B620717) awarded by the Department of Energy (DOE). The Government has certain rights in this invention.

BACKGROUND

Related Art

In some integrated circuit systems, voltage regulators are used to supply electrical power at specified voltages to some or all of the integrated circuits. For example, voltage regulators can be used to supply electrical power at specified voltages to a system on a chip integrated circuit that includes central processing unit (CPU) cores and graphics processing unit (GPU) cores. While voltage regulators can be used to supply electrical power to integrated circuits, the use of voltage regulators introduces cost and complexity to system design. In addition, the use of voltage regulators can result in power efficiency losses that may reduce battery life in devices that rely on batteries for power and reduce performance within a given power envelope.

One arrangement of voltage regulators consists of a single-stage array of buck regulators (i.e., buck converter circuits) in which each of a set of two or more external buck regulators is allocated for supplying electrical power to a corresponding partition of the integrated circuits (e.g., CPU core, GPU core, etc.). For example, each of the "external" buck regulators may be mounted to a circuit board along with a chip package that encloses an integrated circuit chip on which the integrated circuits are located. By providing a separate buck regulator for each partition, this arrangement of voltage regulators enables the dynamic selection of a voltage for each partition. One disadvantage of this arrangement, however, is that the arrangement must be provisioned with buck regulators that are able to provide a maximum power for the corresponding partition. Because it is relatively uncommon that the partitions demand maximum power, the buck regulators, which operate most efficiently at higher currents (and corresponding power levels), regularly operate at inefficient lower currents. In addition, provisioning buck regulators as described results in increased circuit board and package cost, as the circuit board and package must be configured with resources for handling the sum of the maximum electrical currents for each of the partitions.

Another arrangement of voltage regulators consists of two stages of voltage regulators, with an external first stage buck regulator providing a fixed intermediate voltage to an array of second stage buck regulators that are fabricated on an integrated circuit chip along with the integrated circuits. Each second stage buck regulator provides dynamically selectable voltages to a particular partition of the integrated circuits (e.g., CPU core, GPU core, etc.). The fixed intermediate voltage is a relatively high voltage level compared to typical integrated circuit voltage requirements, and thus the second stage buck regulators convert/reduce the fixed intermediate voltage to operational integrated circuit voltages for the corresponding partition. In this arrangement of voltage regulators, currents can be provisioned for realistic maximum current scenarios since the first stage regulator and circuit board/package resources are shared by the second stage buck regulators. One disadvantage of this arrangement, however, is that the second stage buck regulators are complex and costly to integrate and fabricate on the integrated circuit chip.

As described above, the various existing arrangements of voltage regulators for providing power to integrated circuits has significant shortcomings. Improving the arrangement and use of voltage regulators is therefore a concern.

BRIEF DESCRIPTION OF THE FIGURES

Throughout the figures and the description, like reference numerals refer to the same figure elements.

DETAILED DESCRIPTION

Figure 1:
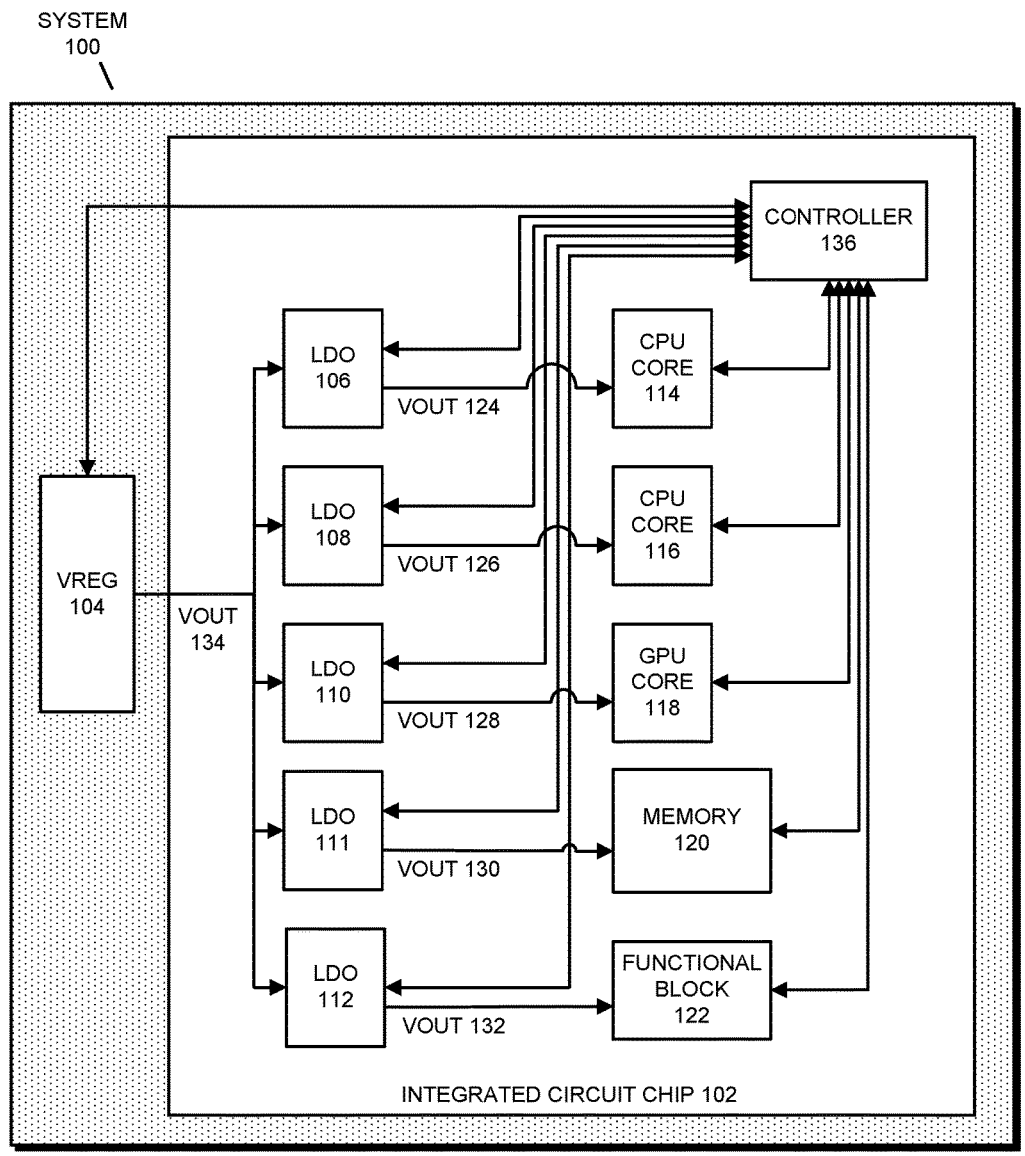
FIG. 1 presents a block diagram illustrating a system in accordance with some embodiments.

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications. Thus, the described embodiments are not limited to the embodiments shown, but are to be accorded the widest scope consistent with the principles and features disclosed herein.

Terminology

In the following description, various terms are used for describing embodiments. The following is a simplified and general description of a few of these terms. Note that the terms may have significant additional aspects that are not recited herein for clarity and brevity and thus the description is not intended to limit the terms.

Supply voltage: a supply voltage is an electrical signal that is supplied to one or more circuits to be used to enable circuit elements to operate. In some cases, the supply voltage is supplied at a substantially steady voltage, but with a current that varies as an electrical demand of the dependent circuits varies, e.g., with transient loads on the circuits. For example, a voltage regulator is a circuit that provides a supply voltage at a substantially steady voltage, but with a current that varies based on the demand of the dependent circuits. By "substantially steady" voltages, it is meant that a supply voltage is, to the extent possible, sustained at or near a configured/given voltage, but that the voltage may vary in certain situations, such as when a transient load occurs on dependent circuits, etc.

Operating point: an operating point includes a setting of one or more circuit parameters with which circuits can be configured for subsequent operation. The circuit parameters can include any parameters that can be set or adjusted, such as voltages, clock frequencies, currents, queue levels, workload types, etc. For example, in some embodiments, each operating point includes, as the circuit parameters, a different frequency-voltage pair. In these embodiments, for each operating point, a specified frequency, e.g., 1.2 GHz or another frequency, is paired with an associated voltage, e.g., 0.9 V or another voltage, so that, when given circuits are set to the operating point, a clock of the given circuits is set to the specified frequency and a supply voltage for the given circuits is set to the specified voltage. In some of these embodiments, there are a fixed number of operating points, e.g., 5, 8, or another number, so that only certain operating points are used.

Overview

The described embodiments include an arrangement of voltage regulators for supplying electrical power at substantially steady voltages to a set of circuits on an integrated circuit chip. The arrangement of voltage regulators includes a single voltage regulator (a "first stage" voltage regulator) external to the integrated circuit chip and two or more voltage regulators ("second stage" voltage regulators) fabricated on the integrated circuit chip. The first stage voltage regulator provides an output voltage that is received as a supply voltage by each of the second stage voltage regulators. The second stage voltage regulators each provide local output voltage that is received as a supply voltage by a different subset of the circuits in the set of circuits. In the described embodiments, the first stage voltage regulator is a switching voltage regulator and the second stage voltage regulators are low-dropout regulators (LDOs).

In the described embodiments, the first stage voltage regulator and the low-dropout regulators can be dynamically configured to provide various output voltages (where "dynamically" means at runtime, as the system operates). For example, in some embodiments, each of the low-dropout regulators can be separately and independently configured to provide output voltages between 0 V and 1.5 V (or between other voltage values). For instance, the low-dropout regulators may be configured or reconfigured in response to supply voltage demands of the corresponding subset of the circuits in the set of circuits. Continuing the example, the first stage voltage regulator can be configured to provide an output voltage between 0 V and 1.7 V (or between other voltage values) based on supply voltage demands of the low-dropout regulators.

In some embodiments, a controller (e.g., a system management unit, power controller, etc.) sets operating points for the subsets of the circuits, each operating point including a corresponding frequency and voltage. For example, the controller can set the operating points at startup, as a workload profile changes, upon the occurrence of a specified event, at a given time or time interval, etc. In these embodiments, the controller selects the operating points for each subset of the circuits by checking a combined power efficiency of the subsets of the circuits and the low-dropout regulators at various operating points, and selecting the one of the various operating points for each subset of the circuits that most closely matches a specified criterion, such as a maximum combined power efficiency. In these embodiments, the various operating points may include initial or current operating points and one or more other operating points that are selected by the controller for some or all of the subsets of the circuits, e.g., based on an algorithm or table. In this way, the controller checks the combined power efficiency at two or more configurations of operating points before selecting the operating point for each subset of the circuits.

In some embodiments, the controller configures of some or all of the first stage voltage regulator and the low-dropout regulators to provide output voltages as described above based on the operating points to which each of the subsets of the circuits is to be set. In other words, the controller determines an operating point for each subset of the circuits, the operating point for each subset of the circuits being associated with a voltage to be used by/supplied to the subset of the circuits. The controller then configures the first stage voltage regulator and the low-dropout regulators to provide the corresponding voltages.

Numerous benefits are found when using the above-described arrangement of voltage regulators. For example, by using the low-dropout regulators to provide supply voltages to the subsets of the circuits in the set of circuits of the integrated circuit chip and the external first stage voltage regulator to provide a variable (i.e., not fixed) supply voltage to the low-dropout regulators, the described embodiments are able to adapt the supply voltages to the real-time operating conditions of the subsets of the circuits in the set of circuits. As another example, by using the single external first stage variable output voltage regulator and the low-dropout regulators fabricated on the integrated circuit chip, the described embodiments distribute the voltage regulators in a manner that requires less costly and complex off-chip circuitry. As yet another example, in comparison to certain existing arrangements of voltage regulators, cost can be saved on the package in which the integrated circuit chip is enclosed and the circuit board on which the package is mounted, because the electrical currents are provisioned between the two stages of voltage regulators according to more realistic operational scenarios. As yet another example, cost and design complexity is avoided with regard to the package and integrated circuit chip, because the dynamically selected output voltage from the first stage voltage regulator can be configured to meet the specific voltage requirement of the low-dropout regulators—providing improved power efficiency in specific workload scenarios. As yet another example, the low-dropout regulators are simpler than buck regulators, and so the monetary and design complexity cost of the described embodiments is lower than existing arrangements in which buck regulators are used. As yet another example, by checking the combined power efficiency and setting the operating points for the subsets of the circuits as described herein, both the power consumption of the subsets of the circuits and the power loss in the LDOs is accounted for when setting the operating points, which results in more efficient use of power by the integrated circuit chip. The described embodiments therefore improve the overall electrical power usage and general function of the integrated circuit chip and/or a system in which the integrated circuit chip is used.

System

FIG. 1 presents a block diagram illustrating a system 100 in accordance with some embodiments. As can be seen in FIG. 1, system 100 includes an integrated circuit chip 102 coupled to a voltage regulator 104 ("VREG" 104). Voltage regulator 104 is a switching voltage regulator that provides electrical power at an output voltage, VOUT 134, which serves as a supply voltage to a set of low-dropout regulators (and possibly other circuits, which are not shown) on integrated circuit chip 102. For example, voltage regulator 104 may be a buck converter, a boost converter, or another type of switching voltage regulator. As described in more detail below, voltage regulator 104 may be dynamically configured and reconfigured to provide various output voltages during the operation of system 100.

Integrated circuit chip 102 is a semiconductor chip on which various circuit elements have been fabricated, including low-dropout regulators 106-112 ("LDO" 106-112), central processing unit cores 114-116 ("CPU core" 114-116), graphics processing unit core 118 ("GPU core" 118), memory 120, functional block 122, and controller 136. CPU cores 114-116 are microprocessor cores that perform various computing operations. GPU core 118 is a graphics processor core that performs graphics processing and/or various other computing operations. Memory 120 is a functional block with memory circuits (dynamic random access memory, flash memory, etc.) that performs operations for storing instructions and data for other functional blocks in system 100 (e.g., CPU core 114-116, GPU core 118, etc.). Functional block 122 performs corresponding operations such as operations of a network processor, an audio visual processor, a cryptoprocessor, an artificial intelligence (AI) processor, etc.

CPU cores 114-116, GPU core 118, memory 120, and functional block 122 are part of a "set" of circuits on integrated circuit chip 102, each of CPU cores 114-116, GPU core 118, memory 120, and functional block 122 including or being a different "subset" of the circuits in the set of circuits. For example, CPU core 114 may be a first subset of the circuits in the set of circuits, CPU core 116 may be a second subset of the circuits in the set of circuits, GPU core 118 may be a third subset of the circuits in the set of circuits, memory 120 may be a fourth subset of the circuits, and functional block 122 may be a fifth subset of the circuits in the set of circuits.

Low-dropout regulators 106-112 are linear voltage regulators that are configured to provide electrical power at substantially steady local output voltages, each of which serves as a supply voltage for a corresponding subset of the circuits in the set of circuits in integrated circuit chip 102. For example, low-dropout regulator 106 provides a local output voltage VOUT 124 that serves as a supply voltage for CPU core 114 (i.e., a first subset of the circuits in the set of circuits), low-dropout regulator 108 provides a local output voltage VOUT 126 that serves as a supply voltage for CPU core 116, low-dropout regulator 110 provides a local output voltage VOUT 128 that serves as a supply voltage for GPU core 118, low-dropout regulator 111 provides a local output voltage VOUT 130 that serves as a supply voltage for memory 120, and low-dropout regulator 112 provides a local output voltage VOUT 132 that serves as a supply voltage for functional block 122. As described in more detail below, each of low-dropout regulators 106-112 may be dynamically and separately configured and reconfigured to provide various local output voltages during the operation of system 100.

Note that the output voltages provided by low-dropout regulators 106-112 are called "local" in this description in order to distinguish these output voltages from the output voltage provided by voltage regulator 104. The local output voltages are otherwise simply output voltages that are provided to the subsets of the circuits in the set of circuits as described herein.

As described above, voltage regulator 104 and low-dropout regulators 106-112 can be dynamically configured to provide various output voltages. In some embodiments, system 100 performs the dynamic configuration by first determining a local output voltage to be provided by each low-dropout regulator 106-112. For example, an operating point, which is associated with a particular operating voltage, may be selected for each subset of the circuits based on a combined power efficiency of the subsets of the circuits and low-dropout regulators 106-112. Continuing the example above, this means that the local output voltage, VOUT 124, for low-dropout regulator 106 can be determined based on an operating point selected for CPU core 114, the output voltage for low-dropout regulator 108 can be determined based on an operating point selected for CPU core 116, etc. Based on the local output voltage to be provided by each low-dropout regulator 106-112, the system determines an output voltage for voltage regulator 104 (which, again, supplies all of low-dropout regulators 106-112). The output voltage for voltage regulator 104 should be sufficiently high to enable the operation of low-dropout regulators 106-112, but is generally kept as low as possible to avoid unnecessary electrical power consumption, heat generation, etc. Thus, voltage regulator 104's output voltage is determined based on the highest-demanding low-dropout regulator 106-112, i.e., the low-dropout regulator 106-112 that will be providing the highest local output voltage. The system then configures voltage regulator 104 to provide the output voltage and configures low-dropout regulators 106-112 to provide the local output voltage (not necessarily in that order).

In some embodiments, the above-described selection of operating points, and thus the associated selection of local supply voltages to be provided by the low-dropout regulators 106-112, can be performed at various times during the operation of system 100. For example, at startup, as an activity or load of a subset of the set of circuits (again, CPU core 114, CPU core 116, etc.) changes, as a software program commences or changes phases of execution, every N milliseconds (where N is a numerical value), as a specified event occurs while system 100 is operating, when a physical parameter of some or all of system 100, e.g., temperature, sound, or vibration, reaches a specified level, etc. For example, system 100 may select, for CPU core 114, an operating point having a reduced frequency of a clock in CPU core 114 and an associated reduced voltage when the combined power efficiency indicates that the operating point is better for overall system 100 power performance, which means that low-dropout regulator 106 and possibly voltage regulator 104 can be configured or reconfigured to output corresponding lower local voltage and output voltage, respectively. As another example, system 100 may select, for CPU core 114, an operating point having a reduced frequency of a clock in CPU core 114 and an associated reduced voltage when the CPU core 114 is over-performing, overheating, etc., which means that low-dropout regulator 106 and/or voltage regulator 104 can be configured or reconfigured to output corresponding lower local voltage and output voltage, respectively.

Returning to FIG. 1, controller 136 is functional block that performs some or all of the operations herein described for selecting operating points for the subsets of the circuits and configuring the output voltage provided by voltage regulator 104 and the local output voltages provided by low-dropout regulators 106-112 (and possibly other operations). For example, in some embodiments, controller 136 is a system management unit, a power controller, a voltage regulator controller, and/or another functional block.

In some embodiments, controller 136 receives, retrieves, or otherwise acquires information from some or all of the subsets of the circuits, i.e., CPU core 114, functional block 122, etc., that can be used to determine the power consumption of the subsets of the circuits. In some of these embodiments, controller 136 receives, as the information, a count or estimate of operations being or to be performed in a given amount of time, an indicator of a number of instructions or operations previously executed and/or in a queue, an identification of an idle or busy time, and/or other value(s) representative of a rate at which instructions or operations are being or to be executed or performed. The received value(s) can then be used to compute the power consumption of the subset of the circuits. For example, a received instruction counter or operation counter may be multiplied by a known average per-instruction or per-operation power consumption value for CPU core 116 to estimate the power consumed by CPU core 116. As another example, a memory operation counter (e.g., a write and/or read counter) may be used as an input to a memory power consumption algorithm to estimate the power consumed by memory 120. In some of these embodiments, the information includes an identification of a particular software (e.g., application, operating system routine, etc.) or hardware load being processed, and/or other information that can be used to, via a lookup table or an algorithm, compute an estimated power consumption of the subsets of the circuits. In some of these embodiments, one or more power consumption monitoring circuits in the subsets of the circuits simply provide, as the information, a report of an average power consumption over a specified time, an amount of power consumed since a last report, etc.

In some embodiments, controller 136 may receive, retrieve, or otherwise acquire the information for computing the power consumption of the subsets of the circuits in various ways. For example, a subset of the circuits, e.g., CPU core 114, may write a value to an accessible register (e.g., a performance counter) or a shared memory location indicating the number of instructions or operations that were, are being, or are to be performed in the subset of the circuits. Controller 136 may then access/read the register or shared memory location to determine the information. As another example, controller 136 may communicate a request (e.g., via a system bus, signal lines, etc.) for the information to a subset of the circuits and, in response, receive a response communication from the subset of the circuits with the information. As another example, an operating system, hypervisor, and/or other software entity may communicate the information to controller 136 using a memory location/register, packet, instruction, or other communication mechanism.

In some embodiments, system 100 includes a mounting device (not shown) to which integrated circuit chip 102 and voltage regulator 104 are separately coupled (e.g., mounted, clamped, pressed, adhered, etc.) to provide stability and mechanical support. For example, the mounting device can be one or more of a circuit board, an active or inactive semiconductor interposer, a socket, a bracket, and/or another mechanical mounting device. In these embodiments, the mounting device may include traces, guides, pads, regions, etc. via which supply voltages such as VOUT 134 and other electrical signals are communicated between voltage regulator 104 and integrated circuit chip 102.

In some embodiments, system 100 includes a package (not shown) in which integrated circuit chip 102 is enclosed or otherwise mounted. For example, the package may be a pin grid array package, a flat package, a small outline package, a ball grid array package, etc. As is typical with such packages, various pins, leads, solder bumps, regions, etc. and corresponding package-internal routing are provided for communicating electrical signals between integrated circuit chip 102 and devices (circuit boards, interposers, sockets, etc.) to which the package is mounted. In some embodiments, and differently than in some existing systems, the package does not include voltage regulator circuit elements. In other words, the circuit elements of the voltage regulators and the low-dropout regulators—not including pins, signal routes, traces, guides, regions, etc. used to route supply voltages through a package to integrated circuit chip 102—are either entirely external to integrated circuit chip 102, as in voltage regulator 104, or entirely fabricated on integrated circuit chip 102, as in low-dropout regulators 106-112.

In some embodiments, various signal routes, e.g., wires, guides, communication regions, buses, etc. are coupled between two or more elements in system 100 to communicate electrical signals between the elements. For example, one or more signal routes, which are shown as using a representative single signal line in FIG. 1, may be coupled between controller 136 and CPU core 114 to enable the communication of electrical signals, values, settings, etc. as described herein.

Although various elements are shown in integrated circuit chip 102, in some embodiments, different elements are present in integrated circuit chip 102. Generally, integrated circuit chip 102 includes sufficient elements to perform the operations for setting operating points for different subsets of the circuits and configuring the local output voltages provided to the subsets of the circuits in a set of circuits by two or more low-dropout regulators and an output voltage provided to the two or more low-dropout regulators by an external voltage regulator.

System 100 can be, or can be included in, any electronic device that performs computational operations. For example, system 100 can be, or can be included in, electronic devices such as desktop computers, laptop computers, wearable computing devices, tablet computers, virtual or augmented reality equipment, smart phones, artificial intelligence (AI) devices, servers, network appliances, toys, audio-visual equipment, home appliances, vehicles, etc., and/or combinations thereof.

Setting Operating Points

Figure 2:
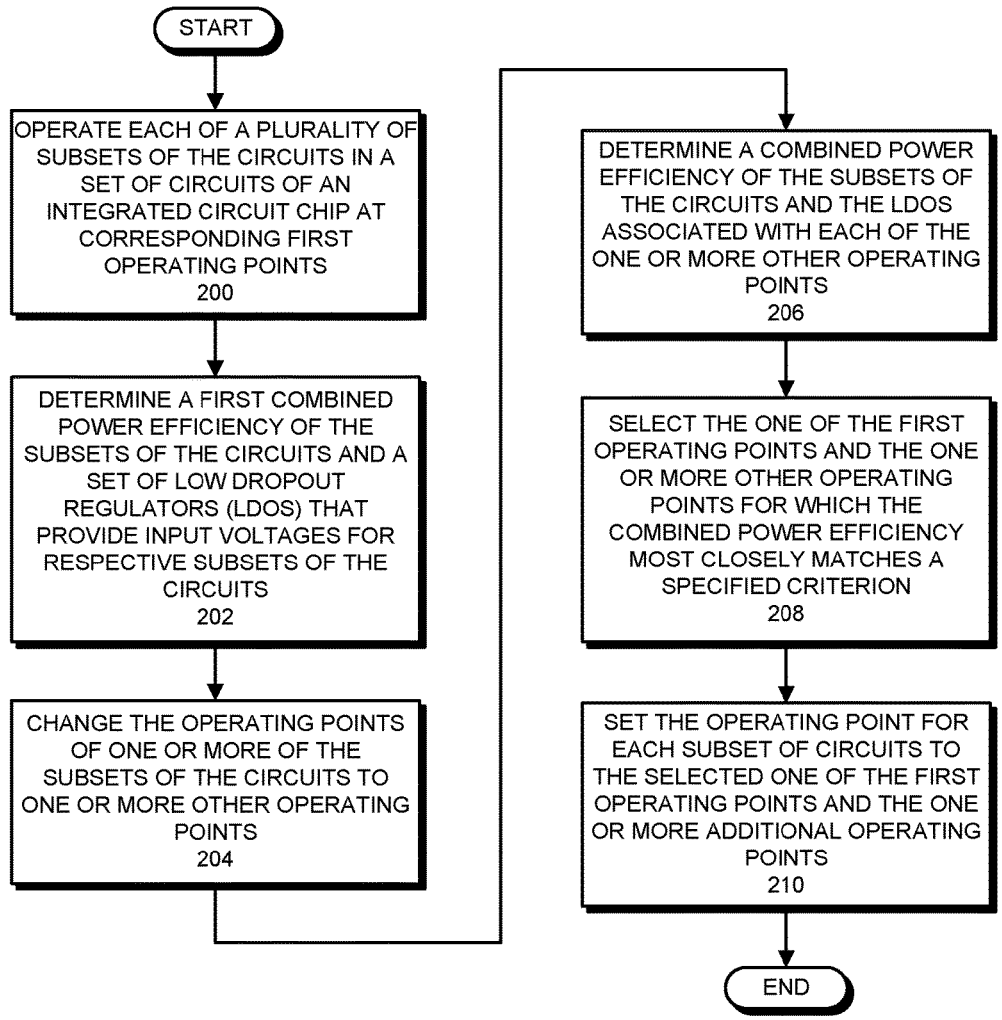
FIG. 2 presents a flowchart illustrating a process for setting operating points for subsets of circuits in a set of circuits in accordance with some embodiments.

As described above, the described embodiments perform operations for setting operating points for subsets of the circuits in system 100 based at least in part on a combined power efficiency of the subsets of the circuits and the LDOs. FIG. 2 presents a flowchart illustrating a process for setting the operating points for the subsets of the circuits in accordance with some embodiments. Note that the operations shown in FIG. 2 are presented as a general example of functions performed by some embodiments. The operations performed by other embodiments include different operations and/or operations that are performed in a different order. Additionally, although certain mechanisms are used in describing the process (e.g., controller 136, etc.), in some embodiments, other mechanisms can perform the operations.

The process shown in FIG. 2 can be performed at any time during the operation of system 100. For example, the process can be performed at or near a startup, at one or more specified, periodic, or repeating times, upon the occurrence of one or more specified events, when requested by one or more entities (e.g., operating systems, CPU cores, etc.), when a software program starts or changes execution phases, when a particular physical system state (temperature, etc.) is encountered, and/or at other times. In other words, the operating points for the subsets of the circuits are dynamically configurable as system 100 operates. This can help to ensure that the subsets of the circuits operate at desirable operating points, so that system 100 consumes electrical power more efficiently (i.e., generally consumes electrical power commensurate with the operations being performed in the subsets of the circuits), operates at lower temperatures, etc., while also ensuring that system 100 remains responsive for processing computational loads.

Although combined power efficiency alone is described as being used to set the operating state for the subsets of the circuits in FIG. 2, in some embodiments, other factors, system values, etc. are used in addition to combined power efficiency to for setting the operating points. In these embodiments, factors such as a temperature, a busyness, a workload profile, etc., may be used to adjust or scale the operating points. For example, in the embodiments where a temperature (e.g., a temperature of a functional block, region, etc. of integrated circuit chip 102 or system 100) is used for adjusting or scaling the operating points, operating points for one or more subsets of the circuits that are determined using the combined power efficiency may be adjusted or scaled down, in terms of the voltage and/or the frequency, when a temperature or a gradient or trend of a temperature is above a specified threshold. In this way, system 100 is not limited to only using combined power efficiency to set operating points, but instead may use multiple factors. Note that, in some embodiments, in certain situations, operating points for one or more of the subsets of the circuits are simply set to particular operating points. For example, to protect the subsets of the circuits from overheating, to process a high-priority workload, etc.

The process shown in FIG. 2 starts when each of a plurality of subsets of circuits in a set of circuits of integrated circuit chip 102 operates at a corresponding first operating point (step 200). During this operation, subsets of the circuits such as CPU core 114, CPU core 116, memory 120, etc. operate at corresponding operating points, each operating point comprising a frequency-voltage pair. For example, CPU core 114 may operate at 1.5 V, 1.3 V, or another voltage value, and with a frequency (of a clock to and by which operations are synchronized) of 2.8 GHz, 2.3 GHz, or another frequency, memory 120 may operate at 1.2 V, 0.9 V, or another voltage value, and with a frequency of 900 MHz, 1.5 GHz, or another frequency, etc. Generally, for step 200, each of the subsets of the circuits is operated at a particular operating point—and that particular operating point may or may not be the same operating point as other subsets of the circuits.

Figure 3:
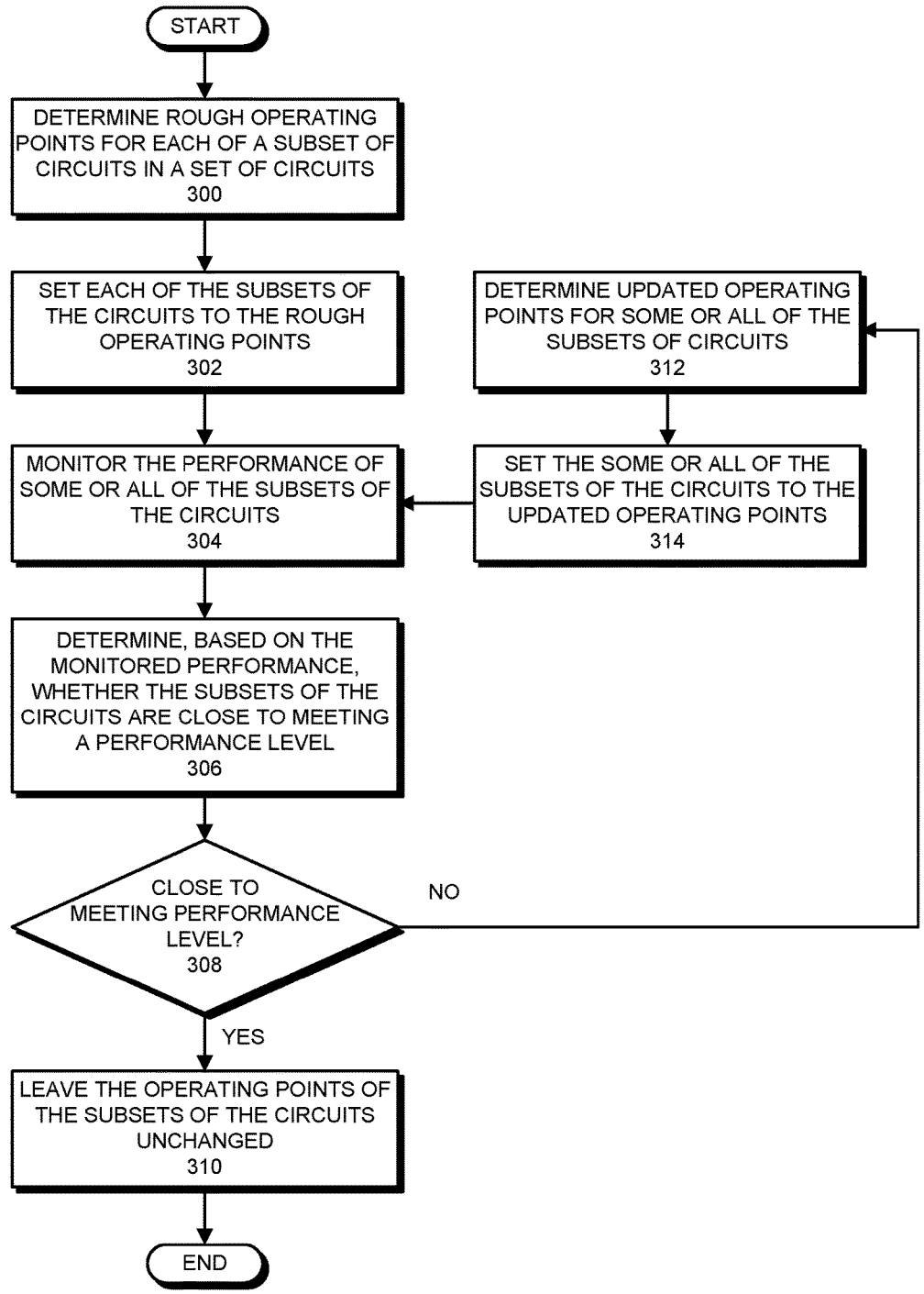
FIG. 3 presents a flowchart illustrating a process for setting initial operating points for subsets of circuits in a set of circuits in accordance with some embodiments.

In some embodiments, the first operating points described for step 200 may have been set by system 100, e.g., by controller 136, at start-up, after a particular event, when a workload profile changed, and/or at another time. In some embodiments, when setting the first operating points, or "initial" operating points, controller 136 performs a checking process to ensure that the subsets of the circuits are, individually and/or as a group, performing sufficiently well. FIG. 3 presents a flowchart illustrating a process for setting initial operating points for subsets of the circuits in accordance with some embodiments. Note that the operations shown in FIG. 3 are presented as a general example of functions performed by some embodiments. The operations performed by other embodiments include different operations and/or operations that are performed in a different order. Additionally, although certain mechanisms are used in describing the process (e.g., controller 136, etc.), in some embodiments, other mechanisms can perform the operations.

As shown in FIG. 3, controller 136 first determines rough operating points (again, a particular voltage and frequency) for each of the subsets of the circuits (step 300). For example, controller 136 can determine the rough operating points using default operating points, based on a lookup table, based on a request from an operating system or program, etc. Generally, the "rough" operating points are operating points that are, among a set of available operating points, assumed or predicted to be more likely to provide a desired performance level for the subsets of the circuits and system 100. For example, if the subsets of the circuits are relatively idle, the rough operating points may have lower frequency and voltage levels, and if the subsets of the circuits are relatively busy, the rough operating points may have higher frequency and voltage levels. As another example, at startup and/or when the idle/busy state of the subsets of the circuits are unknown or unstable, the rough operating points may have middle or average frequency and voltage levels (on a scale of possible frequency and voltage levels). Controller 136 then sets each of the subsets of the circuits to the rough operating points (step 302), i.e., by setting, for each subset of the circuits, a controlling clock to the corresponding frequency and a supply voltage for the subset of the circuits to the corresponding voltage.

Controller 136 next monitors the performance of some or all of the subsets of the circuits (step 304). For instance, controller 136 can acquire performance indicators such as performance counters, operation counts, busyness/idle ratios, processing delays (e.g., queue fullness, etc.), amounts of data processed, numbers of memory accesses, etc. for some or all of the subsets of the circuits for a predetermined time (e.g., N milliseconds, etc.). Controller 136 then determines, based on the monitored performance, whether the subsets of the circuits are close to meeting a performance level (step 306). For example, for one or more of the monitored subsets of the circuits, controller 136 can determine whether a processing delay is "close" to a processing delay threshold (i.e., a performance level) when the processing delay is within a specified margin of the processing delay threshold, i.e., when operations are being performed with close to or exactly a particular amount of delay. For instance, if the processing delay threshold is a value $PD_{Threshold}$ (a particular amount of delay), a given processing delay can be close to the $PD_{Threshold}$ when the given processing delay is within 8% of $PD_{Threshold}$ (close to the particular amount of delay) or equal to $PD_{Threshold}$ (exactly the particular amount of delay).

When the subsets of the circuits are close to meeting the specified performance level (step 308), the (rough) operating points are left unchanged, so that the subsets of the circuits continue to operate at the operating points (step 310). When the subsets of the circuits are not close to meeting the specified performance level (step 308), controller 136 determines updated operating points for some or all of the subsets of the circuits (step 312) and sets the some or all of the subsets of the circuits to the updated operating points (step 314). For example, controller 136 can use the above-described lookup table to determine the operating points, can scale the current/present operating points by a specified factor, and/or can otherwise determine updated operating points. Controller 136 then returns to step 304 to monitor the performance of some or all of the subsets of the circuits.

Using the operations in FIG. 3, controller 136 can try multiple operating points in an attempt to reach operating points at which the performance of the subsets of the circuits is sufficiently close to the specified performance level (i.e., as in steps 302-308 and 312-308). In some cases, when trying operating points, controller 136 determines that previous operating points were closer to meeting the performance level than current operating points and may return to the previous operating points—and may eventually simply leave the subsets of the circuits operating at the previous operating points. In other words, being "close" to the performance level as described herein includes being the closest to the performance level within a particular sequence of operating points. In some embodiments, the process shown in FIG. 3 is limited to a specified number of iterations (e.g., 3, 5, etc.), so that controller 136 will not try more than the specified number of operating points. In other words, in these embodiments, a given number of operating points may be tried and the subsets of the circuits may be left at the operating points that are closest to the performance level among the given number of operating points tried.

Returning to FIG. 2, controller 136 then determines a first combined power efficiency of the subsets of the circuits and the LDOs that provide input voltages for respective subsets of the circuits (step 202). For example, controller 136 can determine the combined power efficiency for subsets of the circuits such as CPU core 114, memory 120, functional block 122, etc., along with the LDOs that provide supply voltages to each of the subsets of the circuits such as LDO 106, LDO 111, LDO 112, etc. Generally, the combined power efficiency is a performance-to-power-consumption ratio that indicates how well (or poorly) the subsets of the circuits and the LDOs are using power, given the performance of the circuits. Note that, although a particular power efficiency metric is described herein, in some embodiments, a different power efficiency metric or metrics is/are used.

For determining combined power efficiency, controller 136 first computes a sum of: (1) the power consumed in each of the subsets of the circuits and (2) the power loss of the LDOs. In other words, controller 136 acquires an amount of power consumed in each of the subsets of the circuits (e.g., in the last N milliseconds, since a last combined power efficiency computation, etc.) and an amount of power loss of the LDOs (e.g., in the last N milliseconds, since a last combined power efficiency computation, etc.) and then sums the amounts. In some embodiments, in order to acquire the amount of power being consumed in a given subset of the circuits, controller 136 acquires a performance counter associated with the given subset of the circuits, the performance counter indicating a number of operations performed by the subset of the circuits (e.g., instructions executed, memory accesses completed, etc.), and multiplies the performance counter by an average-power-per-operation value to arrive at the power consumed by the given subset of the circuits. In some embodiments, in order to acquire the amount of power being consumed in a given subset of the circuits, controller 136 queries the given subset of the circuits or another entity for a power consumption value measured or computed by the given subset of the circuits or the other entity (perhaps using a dedicated power consumption measuring/computing mechanism). In some embodiments, in order to determine the amount of power loss of the LDOs, controller 136 looks up the power loss of the LDOs in a table that lists LDO power loss based on the operating points. In some embodiments, in order to determine the amount of power loss of the LDOs, controller 136 computes the power loss of the LDOs using an algorithm or curve that returns LDO power loss as a function of the operating points. In some embodiments, in order to determine the power loss of the LDOs, controller 136 queries one or more functional blocks that monitor the power loss in the LDOs and receives a response that indicates the power loss in the LDOs.

After determining the sum, controller 136 computes the combined power efficiency as a ratio of a performance measure of the subsets of the circuits and the sum. Generally, the performance measure is a value or combination of values that represent a performance of the circuits. For example, the performance measure may be a rate of completing operations or instructions, a memory access bandwidth, a busyness/idleness percentage, a time-per-instruction or time-per-operation value, etc. The computation of the combined power efficiency, therefore, in some embodiments, involves dividing the performance measure by the sum. For example, a rate of completing operations may be divided by the sum to arrive at the combined power efficiency. In some embodiments, the result of the division may be adjusted, compensated, averaged, etc. using one or more other computations, scalars, previous values of combined power efficiency, etc.

Controller 136 next changes the operating points of one or more of the subsets of the circuits to one or more other operating points (step 204) and determines a combined power efficiency of the subsets of the circuits and the LDOs associated with each of the one or more other operating points (step 206). During this operation, controller 136 changes the operating points for at least some—but not necessarily all—of the subsets of the circuits (again, CPU core 114, memory 120, and/or other subsets of the circuits) to one or more operating points different than the first operating points. For example, assuming that controller 136 changes the operating point for CPU core 116, controller 136 may change a first frequency and voltage, e.g., 3.1 GHz and 1.5 V, to a second frequency and voltage, e.g., 2.5 GHz and 1.3 V. Controller 136 then determines the combined power efficiency for each changed operating point. For example, if one of the changes includes the above-described change to the operating point of CPU core 116, controller 136 will make the change and then determine the combined power efficiency with the changed operating point (similarly to the operations of step 202).

As described above, it is possible that controller 136 does not try operating points other than the first operating point for all of the subsets of the circuits—i.e., that some of the subsets of the circuits were left at the first operating points during steps 202-206. For example, controller 136 may try different operating points for only two of the five available subsets of the circuits in system 100. This may be true because controller 136 may leave certain subsets of the circuits at the first operating point, but change the operating point for one or more others of the subsets of the circuits to one or more other operating points based on a workload (e.g., a GPU- or CPU-intensive load, etc.), a record of a previous combined power efficiency and corresponding operating points, a request from a software or hardware entity (e.g., operating system, control circuit, etc.), a table or algorithm (such as the above-described table or algorithm), etc.

When considered as a sequence with steps 200-202, the operations of steps 204-206 result in a number (e.g., 2, 5, or another number) of configurations of operating points being tested or checked for the combined power efficiency. For example, assuming that operating points are changed only for CPU cores 114-116 and the remaining subsets are left at the first operating points, and that CPU core 114 is changed to two other operating points, while CPU core 116 is changed to one other operating point, a maximum of six different configurations of operating points are checked, as follows: 00000, 10000, 20000, 11000, 21000, 01000, where each numerical position represents, in order, CPU core 114, CPU core 116, GPU core 118, memory 120, and functional block 122, and "0" represents a first operating point, "1" represents a first other operating point (not necessarily the same operating point for CPU core 114 and CPU core 116), and "2" represents a second other operating point.

In some embodiments, in order to determine the operating points to which the one or more of the subsets of the circuits are to be changed, controller 136 performs a lookup (or search) in a table or other record. In these embodiments, the table or record includes a listing of permissible operating points and one or more indications of other/neighboring/next operating points for some or all of the subsets of the circuits. The lookup may therefore include controller 136 looking up a current set of operating points for the subsets of the circuits (e.g., an entry in the record associated with the current operating points for each of the subsets of the circuits) and determining, based on the lookup and perhaps other factors such as the combined power efficiency, operating points to which one or more subsets of the circuits are to be changed. In some embodiments, in order to determine operating points to which the one or more of the subsets of the circuits are to be changed, controller 136 computes the operating points as a result of an algorithm, the algorithm returning the operating points as a function of some or all of: current operating point(s), the combined power efficiency, and/or one or more other values.

Controller 136 next selects the one of the first operating points and the one or more other operating points for which the combined power efficiency most closely matches a specified criterion (step 208). During this operation, controller 136 chooses, from among the multiple configurations of operating points, the particular configuration of operating points that most closely approaches or replicates the specified criterion. Continuing the example above, this configuration could be any of the 00000, 10000, . . . 21000, 01000 configurations. Recalling that the combined power efficiency for the example in FIG. 2 is a ratio of performance measure to a sum of power consumption in the subsets of the circuits and power loss of the LDOs, the specified criterion can be any criterion associated with, reflective of, or indicating the combined power efficiency. For example, in some embodiments, the specified criterion is a maximum combined power efficiency, such as a theoretical maximum combined power efficiency, a measured or tested maximum combined power efficiency for system 100, a specified maximum combined power efficiency, and/or another value for maximum combined power efficiency. In these embodiments, the configuration of operating points that most closely matches the maximum combined power efficiency is selected in step 208.

Note that "most closely matches" as used herein does not necessarily mean "matches," and there may be a significant difference between the combined power efficiency for the selected configuration of operating points and the specified criterion. Generally, the configuration of operating points that "most closely matches" is a best-matching configuration from among the multiple configurations of operating points that were tried. For example, if the maximum combined power efficiency is a value $PE_{MAX}$ and the six configurations of operating points described above have the following PE values—00000: $0.9*PE_{MAX}$, 10000: $0.88*PE_{MAX}$, 20000: $0.94*PE_{MAX}$, 11000: $0.86*PE_{MAX}$, 21000: $0.97*PE_{MAX}$, 01000: $0.9*PE_{MAX}$, the most closely matching configuration of operating points is 21000 at $0.97*PE_{MAX}$ (or 97% of $PE_{MAX}$). Although the 21000 operating point does not exactly match $PE_{MAX}$, the operating point is the most closely matching of the multiple configurations. Depending on the value of $PE_{MAX}$, a value that exceeds $PE_{MAX}$ may be the most closely matching of the configurations of operating points.

Controller 136 then sets the operating point for each subset of the circuits to the selected one of the first operating point and the one or more other operating points (step 210). For example, and continuing the example above, if the 11000 configuration of operating points most closely matches the specified criterion, each of the subsets of the circuits is set to a corresponding frequency and voltage, i.e., by setting, for each subset of the circuits, a controlling clock to the corresponding frequency and a supply voltage for the subset of the circuits to the corresponding voltage.

By performing the operations shown in FIGS. 2-3, controller 136 tries a number of configurations of operating points before settling on a particular configuration of operating points at which the subsets of circuits are set. In some embodiments, controller 136 performs the operations of FIGS. 2-3 without being directed to do so by other hardware and/or software entities in system 100, i.e., without receiving a request from an operating system. By "tweaking" the operating points (i.e., automatically trying a number of operating points) as described to find a most closely matching configuration of operating points, controller 136 can help to ensure that the subsets of the circuits are set to operating points (at least among the tried operating points) that result in system 100 more efficiently using power.

In some embodiments, the tables, algorithms, curves, etc. described for FIGS. 2-3, e.g., the lookup table described for step 300, etc., are trained or configured based on tests or benchmarks run on system 100. In other words, test loads can be run on system 100 and system 100's performance can be monitored to enable the generation of the tables, algorithms, curves, etc. Alternatively, the tables, algorithms, curves, etc. can be supplied by a manufacturer of system 100, can be generated based on software models of system 100, etc. Generally, the tables, algorithms, curves, etc. are generated to reflect expected real-world behavior of system 100 and the components and elements therein.

Configuring Voltages for Voltage Regulators

Figure 4:
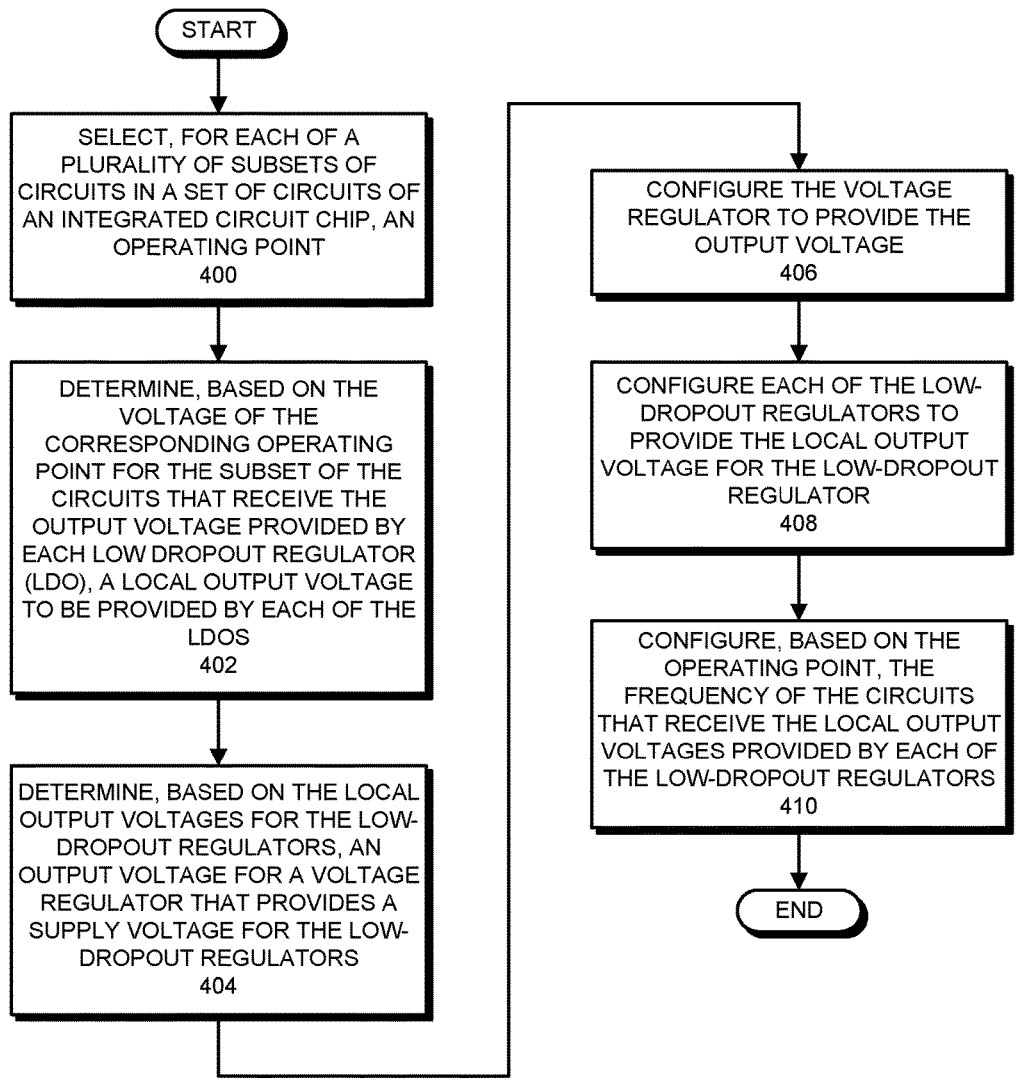
FIG. 4 presents a flowchart illustrating a process for configuring an output voltage for a voltage regulator and local output voltages for two or more low-dropout regulators in accordance with some embodiments.

As described above, the described embodiments perform operations for configuring the output voltage for voltage regulator 104 and the local output voltages for low-dropout regulators 106-112. FIG. 4 presents a flowchart illustrating a process for configuring an output voltage for a voltage regulator and the local output voltages for two or more low-dropout regulators in accordance with some embodiments. Note that the operations shown in FIG. 4 are presented as a general example of functions performed by some embodiments. The operations performed by other embodiments include different operations and/or operations that are performed in a different order. Additionally, although certain mechanisms are used in describing the process (e.g., controller 136, etc.), in some embodiments, other mechanisms can perform the operations.

As described below, the process shown in FIG. 4 is typically performed when operating points are set for the subsets of the circuits (as described above for FIGS. 2-3), but is not limited to these times. The process shown in FIG. 4 can be performed at any time during the operation of system 100. For example, the process can be performed at or near a startup, at one or more specified, periodic, or repeating time(s), upon the occurrence of specified event(s), when requested by one or more entities (operating systems, CPU cores, etc.), when a software program starts or changes execution phases, when a particular physical state (temperature, etc.) is encountered, and/or at other times. In other words, the local output voltages for low-dropout regulators 106-112 and the output voltage for voltage regulator 104 are dynamically configurable as system 100 operates. The dynamic configuration of LDOs 106-112 and voltage regulator 104 can help to ensure that system 100 consumes less electrical power, operates at lower temperatures, etc., while also ensuring that system 100 remains responsive for processing computational loads.

The process shown in FIG. 4 starts when controller 136 selects an operating point for each subset of the circuits (step 400). During this operation, controller 136 performs operations such as those shown in steps 200-210 of FIG. 2. Because these operations are described above, they will not be described for FIG. 4. Recall, however, that the operating point for each subset of the circuits comprises a frequency and a voltage to which the subset of the circuits is to be set.

Controller 136 then determines, based on the voltage of the corresponding operating point for the subset of the circuits that receive the local output voltages provided by each of the low-dropout regulators, a local output voltage for each of the low-dropout regulators (step 402). In this way, a separate (but not necessarily different) local output voltage is determined for each low-dropout regulator based on the voltage of the selected operating point of the corresponding subset of the circuits.

Controller 136 next determines, based on the local output voltages for the low-dropout regulators, an output voltage for a voltage regulator (e.g., a switching voltage regulator such as voltage regulator 104) (step 404). During this operation, controller 136, using a lookup table, an algorithm, and/or other operation, determines an output voltage to be provided by the voltage regulator that is sufficiently high to enable the proper operation of each/all of the low-dropout regulators, but that is also not substantially higher than necessary. Generally, the low-dropout regulators need, to enable correct operation, an input voltage that is equal to or higher than the local output voltage. Controller 136 can therefore, in some embodiments, use an algorithm such as an addition (e.g., adding an offset value to the highest low-dropout regulator output voltage, such as 0.2 V, 0.3 V, etc.) or a multiplication by a scaling value (e.g., multiplying the highest low-dropout regulator output voltage by a scaling value, such as 1.1, 1.2, etc.) to determine the output voltage for the voltage regulator. Controller 136 can, in some embodiments, perform a lookup in a table in which each of a set of local output voltage values is associated with a corresponding output voltage for the voltage regulator to acquire the output voltage. Controller 136 may also simply set the output voltage equal to the highest of the local output voltages.

In some embodiments, the lookup table, algorithm, and/or other operation that is/are used to determine the output voltage for the voltage regulator are dynamically configurable. For example, in an embodiment that uses a lookup table, the lookup table may be updated or replaced by an operating system or software program, a user, controller 136, one of the subsets of the circuits, etc. as system 100 operates. In this way, the output voltage determined in step 404 can be changed or adjusted over time—which can help ensure that the system uses desirable output voltages for configuring the voltage regulator. In some embodiments, the dynamic configuration of the lookup table, algorithm, and/or other operation follows one or more general policies or rules. In these embodiments, the dynamic configuration may occur every so often (e.g., every N milliseconds, etc.) to ensure that, given or based on the dynamic configuration, the general policies or rules are being met.

Controller 136 then configures the voltage regulator to provide the output voltage (step 406). During this operation, controller 136, e.g., via a corresponding control signal, sets, adjusts, or otherwise causes circuit elements in the voltage regulator to commence providing/outputting the output voltage. For example, controller 136 can set or adjust a bias or reference voltage that is supplied to circuit elements of the voltage regulator to cause those circuit elements to commence providing the output voltage. As another example, controller 136 can configure elements of the voltage regulator, such as amplifiers, resistors, capacitors, inductors, etc. to cause the voltage regulator to commence providing the output voltage. As another example, controller 136 can set a value in a register or memory element that is used by one or more control circuits or elements for the voltage regulator to determine how to set the output voltage for the voltage regulator, thereby causing the voltage regulator to commence providing the output voltage.

Controller 136 then configures each of the low-dropout regulators to provide the local output voltage for the low-dropout regulator (step 408). During this operation, controller 136, e.g., via corresponding control signals, sets, adjusts, or otherwise causes circuit elements in each low-dropout regulator to commence providing/outputting the corresponding local output voltage. For example, controller 136 can set a bias or reference voltage that is supplied to circuit elements of a given low-dropout regulator to cause those circuit elements to commence providing the output voltage. As another example, controller 136 can configure elements of a given low-dropout regulator, such as amplifiers, resistors, capacitors, etc. to cause the given low-dropout regulator to commence providing the output voltage. As another example, controller 136 can set a value in a register or memory element that is used by one or more control circuits or elements for a given low-dropout regulator to determine how to set the output voltage for the given low-dropout regulator, thereby causing the given low-dropout regulator to commence providing the output voltage.

For the example in FIG. 4, the reconfiguration of the voltage regulator to provide the output voltage (in step 406) and the low-dropout regulators to provide the corresponding local output voltages (in step 408) is performed in such a way that unnecessary disruption of local output voltages is avoided during the configuration operation. Generally, this means that the output voltage of the voltage regulator is not reduced below an output voltage that is sufficient for all of the low-dropout regulators to continue providing a previous local output voltage—until the low-dropout regulators are also reconfigured to provide lower local output voltages. For example, the reconfiguration may be atomic or performed at substantially the same time for the voltage regulator and the low-dropout regulators, so that the low-dropout regulators demonstrate reduced ill effects (i.e., interruptions or spikes in local output voltage) from the reconfiguration. As another example, the order of steps 406-408 may be reversed so that a low-dropout regulator's local output voltage is reduced/configured before the output voltage of the voltage regulator is correspondingly reduced/configured.

Controller 136 then configures, based on the operating point, the frequency of the circuits that receive the local output voltages provided by each of the low-dropout regulators (step 410). During this operation, controller 136 directly or indirectly adjusts, updates, or otherwise configures the frequency of the circuits. For example, controller 136 may adjust (i.e., increase or decrease) the clock frequency of one or more clocks to/with which operations in the circuits are synchronized or by which the operations are controlled, may configure the circuits to accept input from another control circuit (a higher or lower frequency clock, etc.), and/or otherwise update the frequency of the circuits.

Although the act of "configuring" voltages and frequencies is described, the configuring includes leaving output voltages, local output voltages, and frequencies unchanged when no change is desirable. For example, when the output voltage and/or local output voltages are already properly configured in accordance with the voltages for the various operating points determined in step 400, the "configuring" may consist of leaving the present output voltage and/or local output voltage unchanged.

In some embodiments, a computing device (e.g., system 100, and/or some portion thereof) uses code and/or data stored on a non-transitory computer-readable storage medium to perform some or all of the operations herein described. More specifically, the computing device reads the code and/or data from the computer-readable storage medium and executes the code and/or uses the data when performing the described operations. A computer-readable storage medium can be any device, medium, or combination thereof that stores code and/or data for use by a computing device. For example, the computer-readable storage medium can include, but is not limited to, volatile memory or non-volatile memory, including flash memory, random access memory (eDRAM, RAM, SRAM, DRAM, DDR, DDR2/DDR3/DDR4 SDRAM, HBM, HMC, etc.), read-only memory (ROM), and/or magnetic or optical storage mediums (e.g., disk drives, magnetic tape, CDs, DVDs).

In some embodiments, one or more hardware modules are configured to perform the operations herein described. For example, the hardware modules can include, but are not limited to, one or more processors/cores/central processing units (CPUs), application-specific integrated circuit (ASIC) chips, field-programmable gate arrays (FPGAs), compute units, embedded processors, graphics processors (GPUs)/graphics cores, pipelines, Accelerated Processing Units (APUs), system management units, power controllers, and/or other programmable-logic devices. When such hardware modules are activated, the hardware modules perform some or all of the operations. In some embodiments, the hardware modules include one or more general-purpose circuits that are configured by executing instructions (program code, firmware, etc.) to perform the operations.

In some embodiments, a data structure representative of some or all of the structures and mechanisms described herein (e.g., integrated circuit chip 102, controller 136, and/or some portion thereof) is stored on a non-transitory computer-readable storage medium that includes a database or other data structure which can be read by a computing device and used, directly or indirectly, to fabricate hardware comprising the structures and mechanisms. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist including a list of gates/circuit elements from a synthesis library that represent the functionality of the hardware including the above-described structures and mechanisms. The netlist may then be placed and routed to produce a data set describing geometric shapes to be applied to masks. The masks may then be used in various semiconductor fabrication steps to produce a semiconductor circuit or circuits corresponding to the above-described structures and mechanisms. Alternatively, the database on the computer accessible storage medium may be the netlist (with or without the synthesis library) or the data set, as desired, or Graphic Data System (GDS) II data.

In this description, functional blocks may be referred to in describing some embodiments. Generally, functional blocks include one or more interrelated circuit elements that perform the described operations. For example, the circuit elements may include integrated circuits, discrete circuit elements, etc. In some embodiments, the circuits in a functional block include circuits that execute program code (e.g., microcode, firmware, applications, etc.) to perform the described operations. For example, a functional block may include one or more processing pipelines, compute units, accelerators, dedicated processing circuits, etc.

In this description, time may be referred to in general terms. For example, "every N milliseconds" or the like. Despite the repeated use of N as a variable, the general references do not necessarily describe the same amount of time in each case—there may be different times intended for some or all of the general references. In other words, N and other letters used to represent variables are not necessarily related to one another.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. An apparatus that controls voltages, comprising:
an integrated circuit chip comprising a set of circuits;
a switching voltage regulator separate from the integrated circuit chip;
a plurality of low dropout (LDO) regulators fabricated on the integrated circuit chip, the switching voltage regulator providing an output voltage that is received as an input voltage by each of the plurality of LDO regulators, and each LDO regulator of the plurality of LDO regulators providing a local output voltage that is received as a local input voltage by a different subset of circuits in the set of circuits; and
a controller configured to set an operating point for each of the subsets of circuits based on a combined power efficiency for the subsets of the circuits and the LDO regulators, each operating point comprising a corresponding frequency and voltage.

2. The apparatus of claim 1, wherein, when setting the operating point for each of the subsets of the circuits, the controller is configured to:
determine a first combined power efficiency of the subsets of the circuits and the LDO regulators while the subsets of the circuits are operating at first operating points;
change the operating points of one or more of the subsets of the circuits to one or more other operating points, each other operating point comprising a different frequency and voltage;
determine a combined power efficiency of the subsets of the circuits and the LDO regulators associated with each of the one or more other operating points; and
set the operating point for each subset of the circuits to the one of the first operating point and the one or more other operating points for which a combined power efficiency most closely matches a specified criterion.

3. The apparatus of claim 2, wherein determining each combined power efficiency comprises:
calculating a sum of a power consumption of the subsets of the circuits and a power loss of the LDOs; and determining the combined power efficiency as a ratio of a performance measure for the subsets of the circuits and the sum.

4. The apparatus of claim 3, wherein the controller is further configured to:
   acquire performance counter information associated with the subsets of the circuits; and
   calculate the power consumption of the subsets of the circuits based at least in part on the performance counter information.

5. The apparatus of claim 3, wherein the controller is further configured to:
   determine the power loss of the LDOs using a power loss algorithm or table, the power loss algorithm or table relating each of a plurality of operating points of the subsets of the circuits to a corresponding power loss of the LDOs.

6. The apparatus of claim 3, wherein the performance measure represents rates at which some or all of the subsets of the circuits are performing corresponding operations.

7. The apparatus of claim 2, wherein the controller is further configured to:
   change the operating points based on an algorithm or table, the algorithm or table relating each of a plurality of operating points of the subsets of the circuits to a corresponding predicted combined power efficiency.

8. The apparatus of claim 2, wherein the specified criterion is a maximum threshold for combined power efficiency.

9. The apparatus of claim 1, wherein the controller is further configured to:
   based on the operating points for each of the subsets of the circuits, identify the local output voltage to be provided by the corresponding LDO regulator;
   based on the local output voltage to be provided by each of the LDO regulators, identify the output voltage to be provided by the switching voltage regulator; and
   configure the switching voltage regulator to provide the output voltage and each LDO regulator to provide the local output voltage to be provided by the LDO regulator.

10. The apparatus of claim 1, wherein the controller is further configured to:
    set an initial operating point for each of the subsets of the circuits, each initial operating point comprising a corresponding initial frequency and voltage; and
    when a performance threshold is not met by the subsets of the circuits, attempt to enable the subsets of the circuits to meet the performance threshold by changing the operating point for some or all of the subsets of the circuits to updated operating points, each updated operating point comprising a corresponding updated frequency and voltage.

11. The apparatus of claim 1, wherein the controller is further configured to:
    detect a workload phase for the integrated circuit chip, the workload phase being associated with corresponding predicted workloads for one or more of the subsets of the circuits; and
    based on the workload phase, perform the setting of the operating points for the subsets of the circuits.

12. A method for controlling voltages in an apparatus having an integrated circuit chip including a set of circuits, a switching voltage regulator separate from the integrated circuit chip, and a plurality of low dropout (LDO) regulators fabricated on the integrated circuit chip, the switching voltage regulator providing an output voltage that is received as an input voltage by each of the plurality of LDO regulators, and each LDO regulator of the plurality of LDO regulators providing a local output voltage that is received as a local input voltage by a different subset of circuits in the set of circuits, the method comprising:
    setting an operating point for each of the subsets of circuits based on a combined power efficiency for the subsets of the circuits and the LDO regulators, each operating point comprising a corresponding frequency and voltage.

13. The method of claim 12, wherein setting the operating point for each of the subsets of the circuits comprises:
    determining a first combined power efficiency of the subsets of the circuits and the LDO regulators while the subsets of the circuits are operating at first operating points;
    changing the operating points of one or more of the subsets of the circuits to one or more other operating points, each other operating point comprising a different frequency and voltage;
    determining a combined power efficiency of the subsets of the circuits and the LDO regulators associated with each of the one or more other operating points; and
    setting the operating point for each subset of the circuits to the one of the first operating point and the one or more other operating points for which a combined power efficiency most closely matches a specified criterion.

14. The method of claim 13, wherein determining each combined power efficiency comprises:
    calculating a sum of a power consumption of the subsets of the circuits and a power loss of the LDOs; and
    determining the combined power efficiency as a ratio of a performance measure for the subsets of the circuits and the sum.

15. The method of claim 14, further comprising:
    acquiring performance counter information associated with the subsets of the circuits; and
    calculating the power consumption of the subsets of the circuits based at least in part on the performance counter information.

16. The method of claim 14, further comprising:
    determining the power loss of the LDOs using a power loss algorithm or table, the power loss algorithm or table relating each of a plurality of operating points of the subsets of the circuits to a corresponding power loss of the LDOs.

17. The method of claim 13, wherein the specified criterion is a maximum threshold for combined power efficiency.

18. The method of claim 12, further comprising:
    based on the operating points for each of the subsets of the circuits, identifying the local output voltage to be provided by the corresponding LDO regulator;
    based on the local output voltage to be provided by each of the LDO regulators, identifying the output voltage to be provided by the switching voltage regulator; and
    configuring the switching voltage regulator to provide the output voltage and each LDO regulator to provide the local output voltage to be provided by the LDO regulator.

19. The method of claim 12, further comprising:
    setting an initial operating point for each of the subsets of the circuits, each initial operating point comprising a corresponding initial frequency and voltage; and
    when a performance threshold is not met by the subsets of the circuits, attempting to enable the subsets of the circuits to meet the performance threshold by changing the operating point for some or all of the subsets of the circuits to updated operating points, each updated operating point comprising a corresponding updated frequency and voltage.

20. The method of claim 12, further comprising:

detecting a workload phase for the integrated circuit chip, the workload phase being associated with corresponding predicted workloads for one or more of the subsets of the circuits; and based on the workload phase, performing the setting of the operating points for the subsets of the circuits.

* * * * *